(12) United States Patent
Friedman (10) Patent No.: US 7,487,146 B2
(45) Date of Patent: Feb. 3, 2009

(54) SYSTEM AND METHOD OF SEARCHING FOR PROVIDING DYNAMIC SEARCH RESULTS WITH TEMPORARY VISUAL DISPLAY

(75) Inventor: Nathaniel Dourif Friedman, Boston, MA (US)

(73) Assignee: Novell, Inc., Provo, UT (US)

( * ) Notice: Subject to any disclaimer, the term of this patent is extended or adjusted under 35 U.S.C. 154(b) by 170 days.

(21) Appl. No.: 11/366,585

(22) Filed: Mar. 3, 2006

(65) Prior Publication Data

US 2007/0033177 A1 Feb. 8, 2007

Related U.S. Application Data

(63) Continuation-in-part of application No. 11/195,754, filed on Aug. 3, 2005, now Pat. No. 7,184,939, and a continuation-in-part of application No. 11/195,731, filed on Aug. 3, 2005, and a continuation-in-part of application No. 11/229,628, filed on Sep. 20, 2005.

(60) Provisional application No. 60/706,009, filed on Aug. 8, 2005.

(51) Int. Cl.
*G06F 17/30* (2006.01)

(52) U.S. Cl. .......................................................... 707/4

(58) Field of Classification Search ..................... 707/2, 707/3, 4; 709/224
See application file for complete search history.

(56) References Cited

U.S. PATENT DOCUMENTS

| | | | |
|---|---|---|---|
| 4,897,782 A | 1/1990 | Bennett et al. ............... 364/200 |
| 5,287,504 A | 2/1994 | Carpenter et al. ........... 395/600 |
| 5,577,241 A | 11/1996 | Spencer ...................... 395/605 |
| 6,081,750 A | 6/2000 | Hoffberg et al. ............... 700/17 |
| 6,272,455 B1 | 8/2001 | Hoshen et al. .................. 704/1 |
| 6,272,507 B1 | 8/2001 | Pirolli et al. ................. 707/513 |
| 6,349,137 B1* | 2/2002 | Hunt et al. ............. 379/265.06 |
| 6,400,996 B1 | 6/2002 | Hoffberg et al. ............... 700/83 |
| 6,480,881 B1 | 11/2002 | Kubota et al. ............... 709/202 |
| 6,647,383 B1 | 11/2003 | August et al. .................. 707/3 |
| 7,213,040 B1 | 5/2007 | Stokes et al. ................. 707/203 |
| 2002/0087649 A1 | 7/2002 | Horvitz ...................... 709/207 |
| 2002/0147805 A1 | 10/2002 | Leshem et al. .............. 709/223 |
| 2002/0174134 A1 | 11/2002 | Goykhman .............. 707/104.1 |
| 2003/0018634 A1 | 1/2003 | Shringeri et al. ............... 707/4 |
| 2003/0099399 A1 | 5/2003 | Zelinski ...................... 382/186 |
| 2004/0030753 A1 | 2/2004 | Horvitz ...................... 709/206 |
| 2004/0049494 A1 | 3/2004 | Kottisa ............................ 707/3 |
| 2004/0049512 A1 | 3/2004 | Kawakita .................... 707/100 |
| 2005/0114374 A1 | 5/2005 | Juszkiewicz et al. ......... 707/101 |
| 2006/0010120 A1 | 1/2006 | Deguchi et al. ................. 707/4 |

OTHER PUBLICATIONS

Otto Bruggeman, [PATCH] kdirwatch.cpp, Sep. 21, 2002, kde-core-devel list http://lists.kde.org/?I=kde-core-devel&m=103265283012353&w=2, 2 pages.

Josef Weidendorfer, Re:[PATCH] kdirwatch.cpp, Sep. 23, 2002, kde-core-devel list http://lists.kde.org/?I=kde-core-devel&m=103279747704133&w=2, 1 page.

Sven Radej, "class KDirWatch", 2003, <http://api.kde.org/3.1-api/classref/kio/KDirWatch.html>.

Microsoft, Outlook 2003 Screenshots, Copyright 2003, 9 pages.

Corbet, "Watching Filesystem Events with Inotify", Sep. 29, 2004, available online: <http://lwn.net/Articles/104343/>, 5 pages.

* cited by examiner

*Primary Examiner*—Etienne P LeRoux
(74) *Attorney, Agent, or Firm*—Pillsbury Winthrop Shaw Pittman LLP (57) ABSTRACT

The invention is directed to a system and method of searching a focal object for related objects. The invention may extract clues or information from the focal object and search the information to identify related objects. The invention also may leverage a chronological timeline of user action information to infer additional relationships with the focal object. The related objects may appear on a display for a predetermined amount of time. The invention may provide icons corresponding to related object with characteristics to signify the relevance of the information.

35 Claims, 6 Drawing Sheets

SYSTEM AND METHOD OF SEARCHING FOR PROVIDING DYNAMIC SEARCH RESULTS WITH TEMPORARY VISUAL DISPLAY

CROSS-REFERENCE TO RELATED APPLICATIONS

This application claims the benefit of U.S. Provisional Application entitled "System and Method of Analyzing a Timeline and Performing Search Functions", No. 60/706,009, filed Aug. 8, 2005, and the present application is also a continuation-in-part of U.S. application Ser. No. 11/195,754 entitled "System and Method of Implementing User Action Monitoring to Automatically Populate Object Launchers", filed Aug. 3, 2005 by Jon Eric Trowbridge and Nathaniel Dourif Friedman; and U.S. application Ser. No. 11/195,731 entitled "System and Method of Searching for Information Based on Prior User Actions", filed Aug. 3, 2005 by Jon Eric Trowbridge and Nathaniel Dourif Friedman; and U.S. application Ser. No. 11/229,628 entitled "System and Method of Associating Objects in Search Results", filed Sep. 20, 2005 by Jon Eric Trowbridge and Nathaniel Dourif Friedman. The entire contents of the above mentioned applications are hereby incorporated by reference for all purposes.

FIELD OF THE INVENTION

This invention relates to a system and method of temporarily providing a user with visual notification of relevant information corresponding to user actions.

BACKGROUND INFORMATION

During the course of a computer session, many actions may be performed on a computer. For several reasons, including increasing workforce productivity, it may be desirable to monitor these actions. Known applications enable monitoring of actions performed on the computer through logging of events, such as keystrokes, web sites visited, emails sent/received, windows viewed, and passwords entered. Known applications further enable capturing of screen shots at scheduled time intervals. Known event monitoring applications are typically run in stealth mode to make them undetectable to users of the monitored computer.

Other known applications enable monitoring of actions performed on the computer through direct monitoring of select types of object-level actions performed using a single application or through direct monitoring of select types of object-level actions performed in a suite of associated applications. Once the select types of object-level actions are logged, they may be displayed.

While known applications present logged events and/or selected types of object-level actions, known applications are deficient at least because they do not monitor and log all types of object-level actions performed across multiple unrelated applications. Additionally, known applications are deficient because they do not identify relationships between the events and/or selected types of object-level actions. For example, known applications do not analyze information associated with each event and/or selected type of object-level action to infer relationships between two or more events and/or two or more objects. Furthermore, known applications are deficient because they do not enable searching for events and/or objects based on the observed actions.

Other drawbacks exist with these and other known applications.

SUMMARY

Various aspects of the invention overcome at least some of these and other drawbacks of known applications. According to one embodiment of the invention, a system is provided that includes at least one client terminal having a processor, a memory, a display and at least one input mechanism (e.g., keyboard or other input mechanism). The client terminal may be connected or connectable to other client terminals via wired, wireless, and/or a combination of wired and wireless connections and/or to servers via wired, wireless, and/or a combination of wired and wireless connections.

Each client terminal preferably includes, or may be modified to include, monitoring software described herein that operates in the background to observe all types of actions performed on the corresponding client terminal. The actions may be associated with objects, including applications, documents, files, email messages, chat sessions, web sites, address book entries, calendar entries or other objects. Objects may include information such as personal information, user data and other information. A focal object may include a current object being operated upon by a user. Other applications may reside on the client terminal as desired.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to another embodiment of the invention, computer initiated actions may be tracked using triggering events. The type of information that corresponds to computer initiated actions may include, for example, when objects are automatically opened and/or closed, when the screen saver is activated, when an auto save is activated, and other computer initiated action information.

The information corresponding to user initiated actions and computer initiated actions may be displayed according to various configurations. For example, information corresponding to user initiated actions and computer initiated actions may be organized and displayed in a timeline. In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. According to one embodiment of the invention, information corresponding to the user initiated actions and/or the computer initiated actions may be presented as graphical information through screenshots, charts, and/or other graphical information. According to another embodiment of the invention, information corresponding to the user initiated actions and/or the computer initiated actions may be displayed in a linear format, non-linear format or other format.

According to one embodiment of the invention, a related object determining system is provided that analyzes clues from a focal object selected by a user to find related objects. Clues are also extracted from related objects to find additional related objects until the clues are exhausted. Clues may include text or meta data extracted from a focal object or related object. In addition, related object determining system analyzes information associated with the user initiated actions that relate to a focal and/or related objects. Relationships may be inferred with the focal object based on a chronological proximity of user initiated actions, a chronological proximity of window focus toggling, or other information.

A graphical user interface may be provided to display the user-selected focal object together with each related objects. In one embodiment, the related objects are placed on a display temporarily. In another embodiment, the related objects are provided with characteristics to indicate their relevance to the focal object.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below. Where applicable, same features will be identified with the same reference numbers throughout the various drawings.

DETAILED DESCRIPTION

Figure 1:
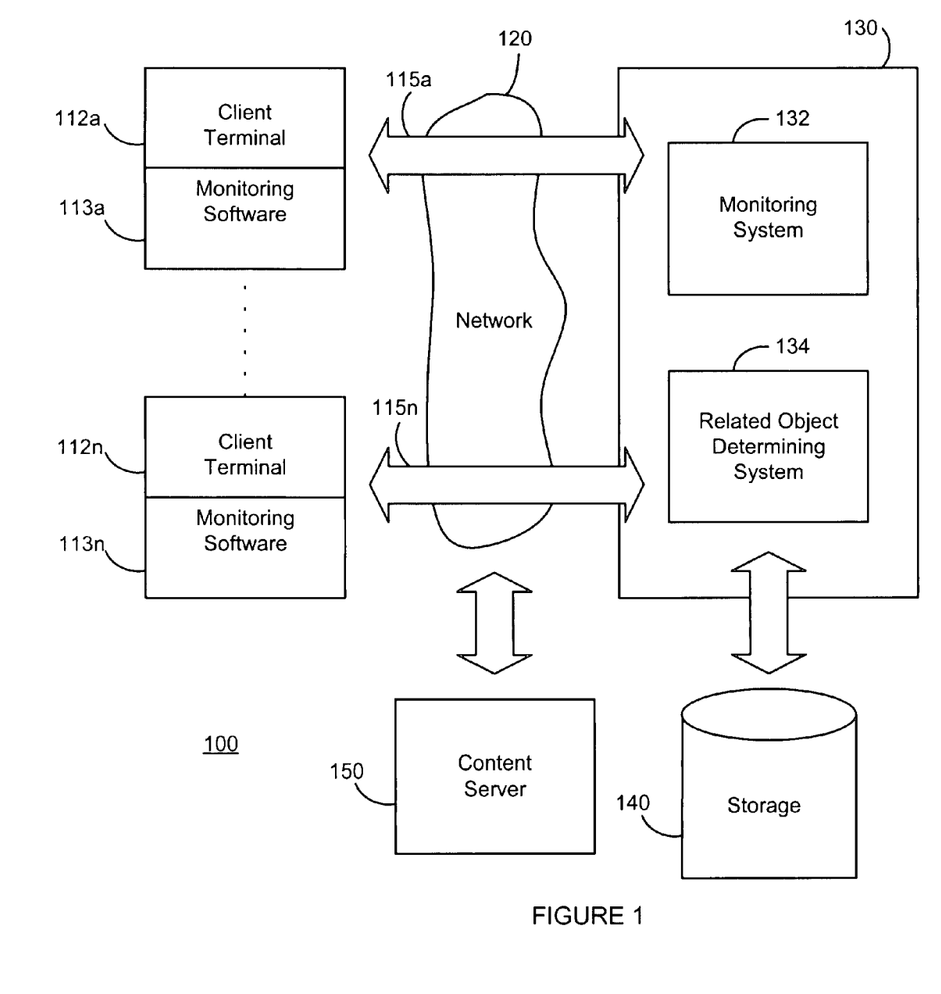
FIG. 1 illustrates an exemplary embodiment of a system diagram according to an embodiment of the invention.

FIG. 1 illustrates an example of the system architecture 100 according to one embodiment of the invention. Client terminals 112a-112n (hereinafter identified collectively as 112) and server(s) 130 may be connected via a wired network, a wireless network, a combination of the foregoing and/or other network(s) (for example the Internet) 120. The system of FIG. 1 is provided for illustrative purposes only and should not be considered a limitation of the invention. Other configurations may be used.

The client terminals 112 may include any number of terminal devices including, for example, personal computers, laptops, PDAs, cell phones, Web TV systems, devices that combine the functionality of one or more of the foregoing or other terminal devices, and various other client terminal devices capable of performing the functions specified herein. According to one embodiment of the invention, users may be assigned to one or more client terminals.

According to one embodiment of the invention, communications may be directed between one client terminal 112 and another client terminal 112 via network 120, such as the Internet. Client terminals 112 may communicate via communications media 115a-115n (hereinafter identified collectively as 115), such as, for example, any wired and/or wireless media. Communications between respective client terminals 112 may occur substantially in real-time if the client terminals 112 are operating online.

According to another embodiment of the invention, communications may be directed between client terminals 112 and content server(s) 150 via network 120, such as the Internet. Client terminals 112 may communicate via communications media 115, such as, for example, any wired and/or wireless media. Communications between client terminals 112 and the content server 150 may occur substantially in real-time if the devices are operating online. One of ordinary skill in the art will appreciate that communications may be conducted in various ways and among other devices.

Communications via network 120, such as the Internet, may be implemented using current and future language conventions and/or current and future communications protocols that are generally accepted and used for generating and/or transmitting messages over the network 120. Language conventions may include Hypertext Markup Language ("HTML"), extensible Markup Language ("XML") and other language conventions. Communications protocols may include, Hypertext Transfer Protocol ("HTTP"), TCP/IP, SSL/TLS, FTP, GOPHER, and/or other protocols.

According to one embodiment of the invention, client terminals 112 may include, or be modified to include, corresponding monitoring software 113a-113n (hereinafter identified collectively as 113) that may operate in the background to observe all types of actions performed on the corresponding client terminal 112. The types of actions performed on the corresponding client terminal 112 may be monitored for any applications accessed through the client terminal. The actions may be associated with objects, including applications, documents, files, email messages, chat sessions, web sites, address book entries, calendar entries or other objects. The objects may include information such as personal information, user data, or other information. According to one embodiment of the invention, monitoring software 113 may include client-side monitoring software. According to another embodiment of the invention, monitoring software 113 may include server-side monitoring software, such as monitoring system 132 that resides on server 130. Agents may be placed on the client terminal 112 to communicate information between monitoring system 132 and the client terminal 112. One of ordinary skill in the art will appreciate that other configurations may be available for deploying the monitoring software 113.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events, including application level activity, user actions performed on objects, a user's activity focus, and/or other triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, a graphical representation of the state of a user interface that can later be used to provide visual clues about previous user activity, and/or other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to one embodiment of the invention, computer initiated actions may be tracked using triggering events including, for example, launching of a screen saver, initiating an auto save, and/or other triggering events. The type of information that corresponds to computer initiated actions may include, for example, when objects are automatically opened and/or closed, when the screen saver is activated, when an auto save is activated, and other computer initiated action information.

According to one embodiment of the invention, the monitoring software 113 may operate undetected by the user. For example, the monitoring software 113 may be transparent to the user and may not appear in the windows task manager, in the registry, startup utilities, and/or other visible locations. In another embodiment of the invention, the monitoring software 113 may operate undetected by the user, but the results may be viewed on demand by users. In yet another embodiment of the invention, the monitoring software 113 may operate with user awareness. One of ordinary skill in the art will readily appreciate that other implementations may be used to monitor and/or view results associated with the observed actions.

According to another embodiment of the invention, the monitoring software 113 may gather information associated with the observed user initiated actions and/or computer initiated actions according to several techniques. In one embodiment of the invention, the information may be gathered using direct observation. For example, the information may be gathered by directly observing a window-based system for tracking information including, for example, tracking when windows appear and/or disappear from the graphical user interface, tracking which window on the GUI is focused, and other tracking information. In another embodiment of the invention, the information may be gathered by directly observing the windows-based system and mapping windows back to the associated applications, among other mapping information. In yet another embodiment of the invention, the information may be gathered by directly observing the windows-based system to monitor when the client terminal is actively being used or sitting idle, among other status information.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening a website in window 12345," among other actions. One of ordinary skill in the art will readily appreciate that other techniques may be used to gather information associated with the observed user initiated actions and/or computer initiated actions.

According to one embodiment of the invention, information corresponding to user initiated actions and computer initiated actions may be processed in real-time or may be stored for subsequent processing. Storage 140, or other storage device, may be used to store the user initiated actions and computer initiated actions, among other data.

According to another embodiment of the invention, separate applications may be used to monitor and organize the gathered information. For example, a first application may be used to gather information according to one or more of the direct observation monitoring technique, the application configuration monitoring technique and other monitoring techniques. A second application may be used to organize the information associated with all of the observed types of actions including, for example, collating and chronologically organizing records of the observed actions, generating any user-defined listing of information corresponding to the observed actions, or applying any other organizing techniques. The separate applications may be embodied in the monitoring software 113, the monitoring system 132, or a combination thereof, among other configurations. One of ordinary skill in the art will readily appreciate that several configurations may be used to monitor and/or organize information associated with all the observed types of actions.

According to another embodiment of the invention, a single application may be used to monitor and organize the gathered information. For example, a single application may include both an observer component that gathers information corresponding to actions that are performed on a computer and an information organizing component, among other components. For example, the single application may be configured to observe and organize user initiated actions associated with objects including, for example, opening/closing objects, switching between objects/windows, and other user initiated actions. The single application may also observe and organize computer initiated actions including, for example, generating a reminder, creating new windows, activating a screen saver, initiating idle time, generating focus-level information, generating application-level information (i.e., opening an application and closing it), and/or other computer initiated actions. The single application may be embodied in the monitoring software 113, the monitoring system 132, or a combination thereof, among other configurations.

Figure 2:
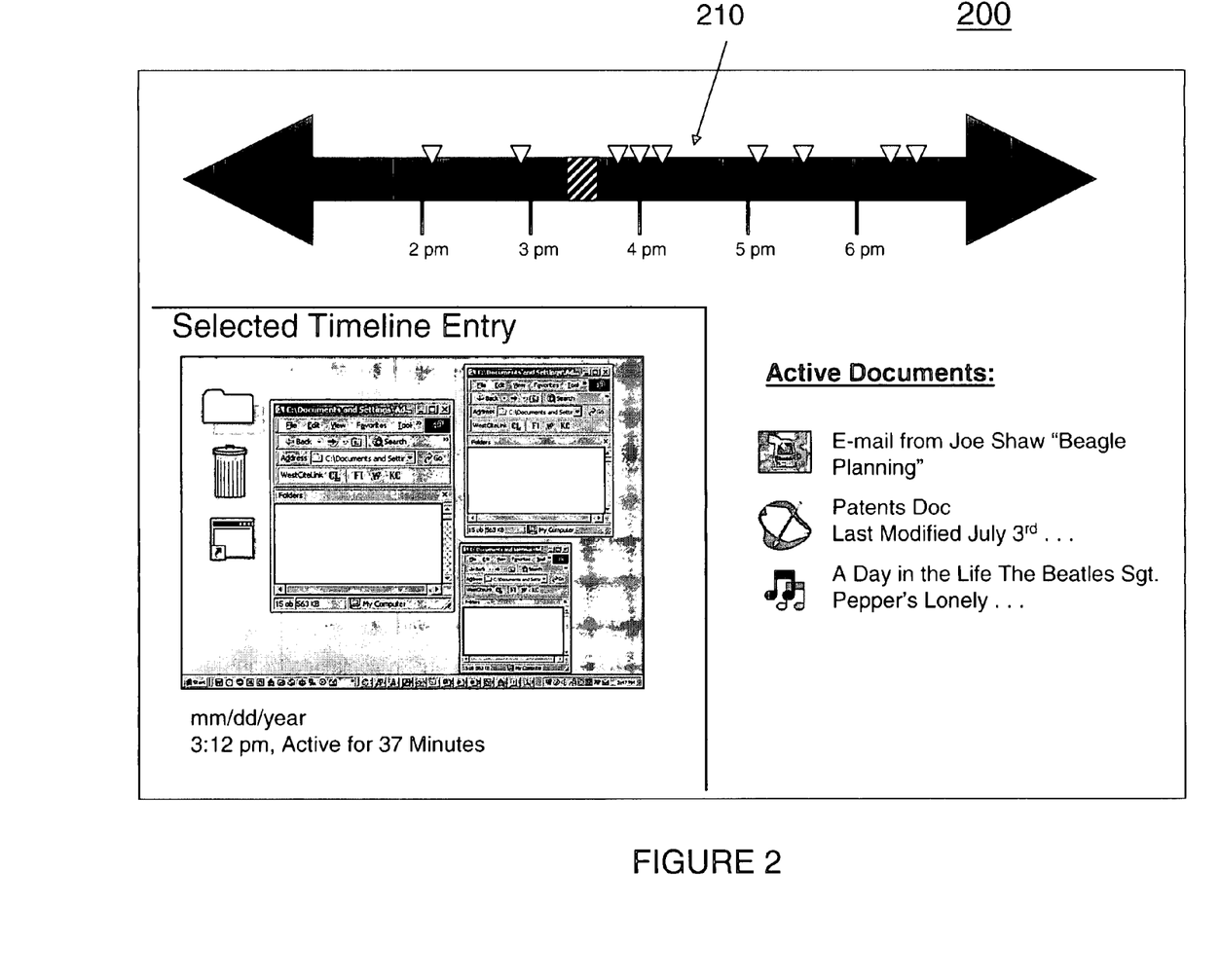
FIG. 2 illustrates an exemplary embodiment of a timeline according to an embodiment of the invention.

The information corresponding to user initiated actions and computer initiated actions may be displayed according to various configurations. As illustrated in FIG. 2, information corresponding to user initiated actions and computer initiated actions may be organized and displayed in a timeline 210. For example, timeline 210 may be arranged to include object entries that are organized in chronological time order. Display 200 may include a display portion 220 that illustrates the content of object entries, wherein the content may include information such as, screenshots, dates that objects are accessed, times that objects are accessed, lengths of time that objects are active, and/or other information. Display 200 may also include a portion 230 that lists active objects. In another embodiment of the invention, information may be organized and displayed according to other configurations.

In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. Regarding the separate display of user initiated action information and computer initiated action information, a first timeline may be provided that displays user initiated actions according to a first user defined configuration. A second timeline may be provided that displays computer initiated actions according to a second user defined configuration. According to another embodiment of the invention, information corresponding to the user initiated actions and/or the computer initiated actions may be displayed in a non-linear format or other format. One of ordinary skill in the art will appreciate that various configurations may be provided for organizing and/or displaying the information corresponding to the user initiated actions and the computer initiated actions.

According to one embodiment of the invention, information corresponding to the user initiated actions and/or the computer initiated actions may be presented as graphical information through screenshots, charts, and/or other graphical information. Graphical information may be associated with objects and may be displayed with corresponding objects. The graphical information may be captured using triggering events associated with the user initiated actions and/or computer initiated actions, including application level changes, active window title bars changes, window focus changes, object focus changes, and/or other triggering events. In one exemplary embodiment of the invention, the graphical information may include a screenshot that captures GUI content as presented to the user.

According to one embodiment of the invention, users may be assigned to several client terminals 112. Thus, one or more monitoring applications 113 may be associated with users. According to another embodiment of the invention, a roaming monitoring application may be assigned to users that enables one monitoring application to operate on several client devices. The timeline associated with a selected user may include an aggregate timeline that organizes and displays information provided from one or more client terminals 112 that are associated with the selected user. Alternatively, several timelines may be associated with the selected user and may be separately displayed. One of ordinary skill in the art will readily appreciate that other techniques may be used to monitor and/or view results associated with one or more client terminals.

Figure 3:
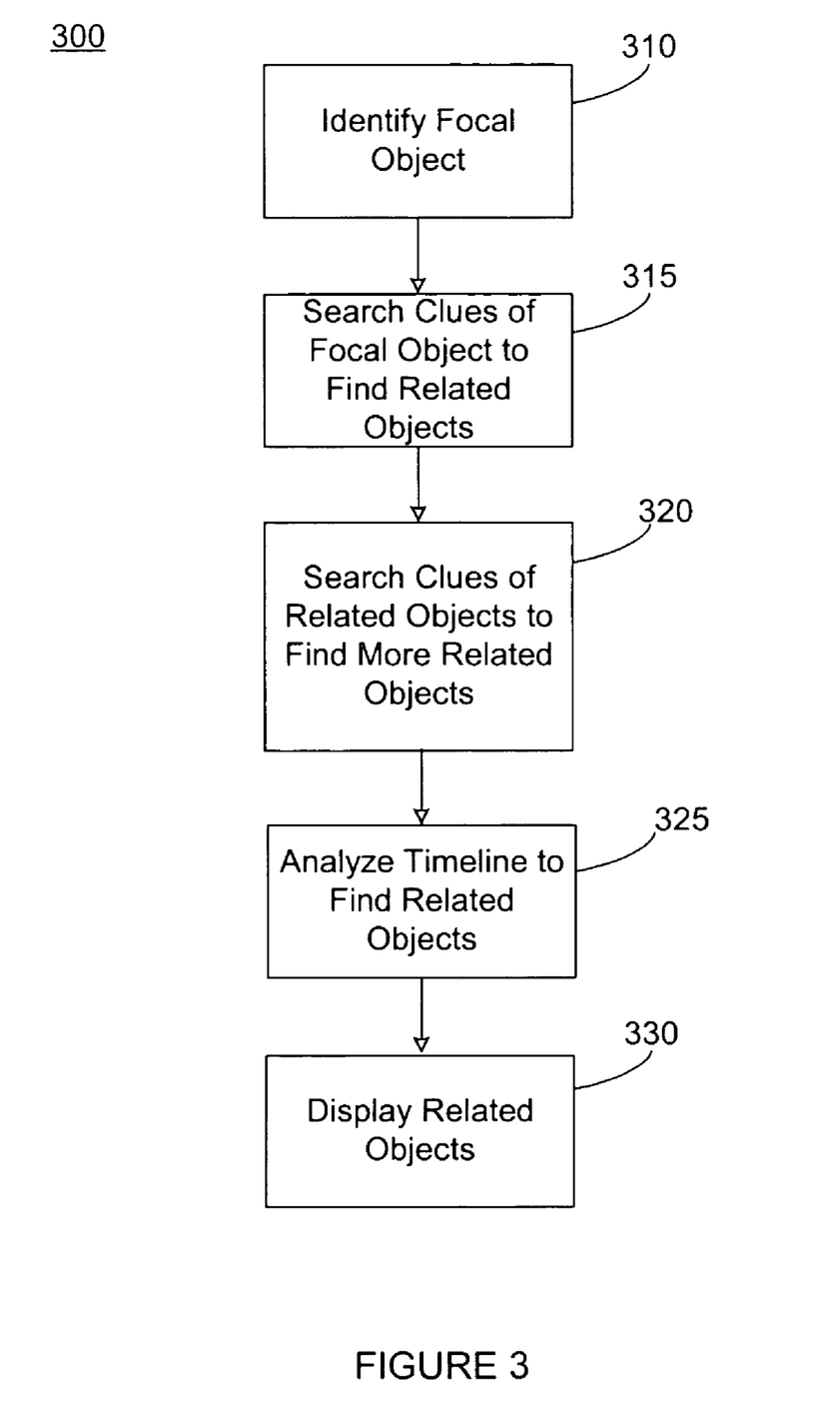
FIG. 3 illustrates a flow chart schematic for analyzing relationships between objects according to an embodiment of the invention.

According to another embodiment of the invention, information corresponding to a focal object, such as an object with which a user is currently interacting, may be analyzed by related object identification system 134. FIG. 3 illustrates a flow diagram 300 of a generalized method for performing a search on a focal object. A focal object may include an object, such as an application, document, file, email message, chat session, IM session, web site, blog or other object, that a user is currently interacting with or desires to have as a focus of a search. In operation 310, a user selects a focal object. In a preferred embodiment, a user may select a focal object on an information portal provided by a graphical user interface. Alternatively, or in addition thereto, related object identification system 134 may select a focal object automatically when a user interacts with a particular object at client terminal 112. Other identification methods may be used, as would be apparent.

In operation 315, clues are obtained from the focal object to find related objects. A clue may be any information that partially describes a user-interactable object in an application. The clues may be used to find objects that the user is not interacting with, but might find relevant based on the current user-interactable object. Clues may include text extracted from the focal object, meta data of the focal object, and other object information. A search on the object information or clues provides related objects.

In operation 320, the system performs query chaining by analyzing the related objects and automatically extracting clues from the related objects to generate additional related objects. The process may be repeated until clues are exhausted or some other threshold is reached. For example, a search on the focal object may return an email message object as a related object. A search on the email message object may return one or more document objects that were included as attachments in the email message object.

Timeline information also is analyzed for related objects in operation 320. For example, timeline information may be analyzed to discover that a first object (i.e., an email message) was opened, followed by the opening of a second object (i.e., a word processing application), followed by the opening and modification of a third object, such as a focal object (i.e., a word processing document). Based upon this analysis, it may be determined that the first and second objects are related objects to the third object.

That is, relationships may be inferred between a focal object and one or more related objects based on a chronological proximity of user initiated actions, a chronological proximity of window focus toggling, or other time-based information. In particular, related object determining system 134 may analyze parameters derived from information associated with the user initiated actions relating to a focal and related objects including, for example, a temporal order in which the objects are accessed, focus toggling between the first object and the third object, opening the first object contemporaneously with the third object, or other user initiated actions, to infer relationships between objects. One of ordinary skill in the art will readily appreciate that other techniques may be used to infer relationships between objects.

Other types of information may be analyzed to infer relationships between objects. One of ordinary skill in the art will readily appreciate that relationships between objects may be inferred by analyzing one or more different parameters derived from common information that corresponds to user initiated actions and/or computer initiated actions.

According to an alternative embodiment of the invention, information corresponding to user initiated actions including, for example, a temporal proximity in which users access two or more objects, a temporal proximity in which users create two or more objects, a temporal proximity in which users edit two or more objects, operations that users conduct in close time proximity, or other information corresponding to user initiated action information, may be used to infer relationships between two or more objects. According to yet another embodiment of the invention, various known statistical methods may be used to infer relationships between two or more objects.

In operation 330, related objects may be displayed in a GUI together with the selected focal object. In one embodiment, related objects are displayed in response to a user interacting with the focal object. In another response, related objects are displayed in response to entering a search query, either manually or by voice.

In one embodiment, a relevancy ranking of each related object to the focal object may be performed to determine whether the strength of the relationship is strong enough for the object to be considered a related object. If the strength of a relationship exceeds a predetermined threshold for a relevancy ranking, it is displayed with the focal object as a related object. Otherwise, it is not displayed and removed as a related object. One of ordinary skill in the art will readily appreciate that other techniques may be used to determine the strength of relationships between objects.

Alternatively, or in addition thereto, placement of the identified related objects with respect to the focal object may be displayed on the GUI based upon a relevancy ranking or the strength of the relationship. For example, the most relevant objects may be located closest to the focal object and the least relevant objects may be located farthest from the focal object.

The relevance ranking may be based on a variety of factors associated with the focal object, such as a frequency of the user initiated actions relating to the focal object and/or related object, simultaneous/sequential occurrence of user initiated action relating to the focal object and related object, a duration of user initiated actions of the focal object and/or related objects, overall chronological proximity of user initiated actions, and/or other factors.

Display arrangement of the focal object and related objects in the GUI are not limited to any particular configuration. For example, rather than basing the arrangement on relevance of the search results to the focal object, the ordering may be user defined, chronologically based on previous user actions, and/ or other display arrangement criteria.

Figure 4:
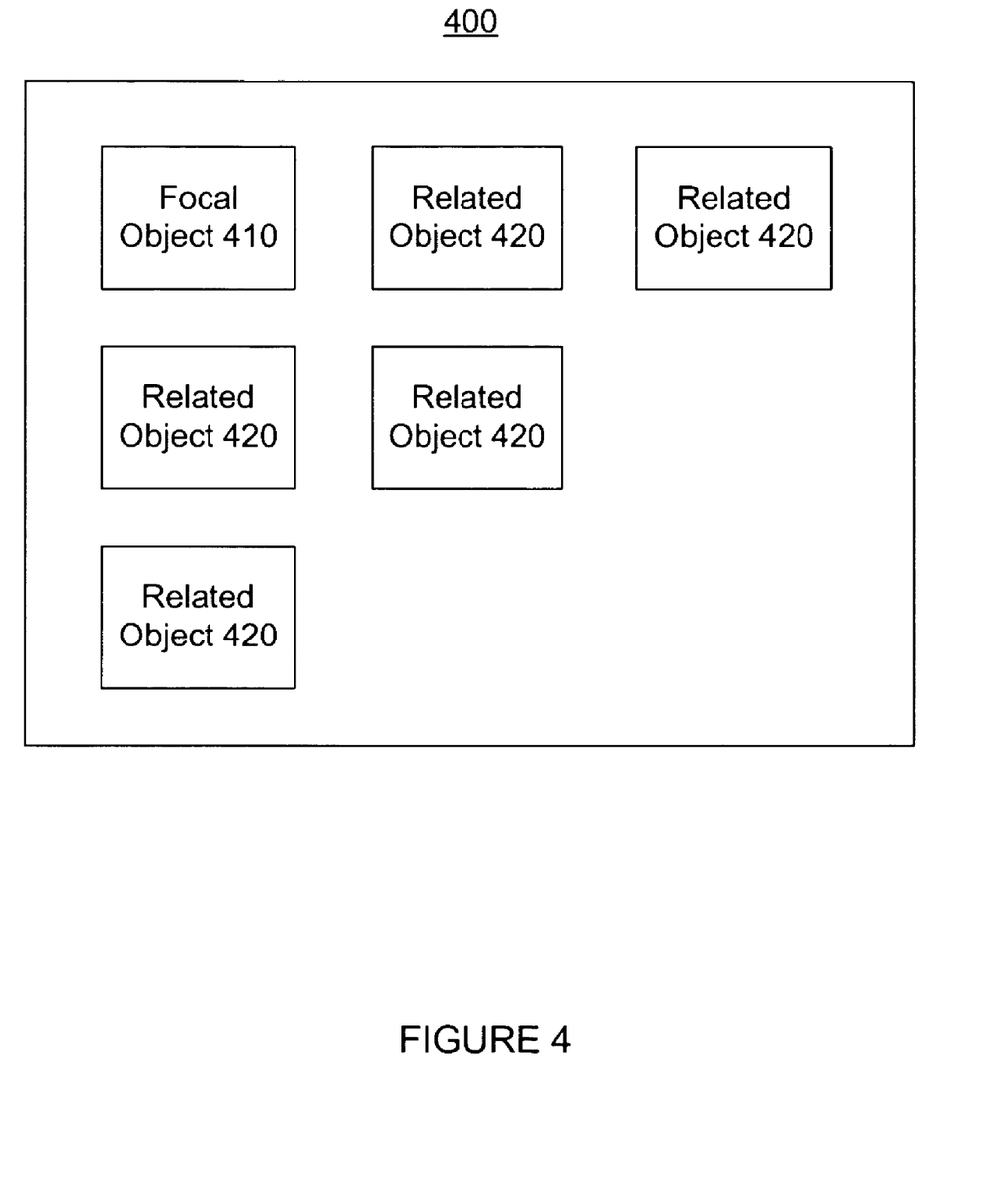
FIG. 4 illustrates an exemplary information portal according to an embodiment of the invention.

FIG. 4 shows an information portal on a graphical user interface (GUI) that includes a user selected focal object and several related objects, according to an embodiment of the invention. Information portal 400 may be provided in a window separated from objects currently in use. Information portal 400 may be provided by an application on a computer system. In a preferred embodiment of the invention, related object determining system 134 provides the application for displaying the information portal. However, one of ordinary skill on the art will appreciate that the application may reside elsewhere.

Portal 400 displays a set of related object search results by related object system 134 from a search on a focal object along with the focal object. As described above, related object determining system 134 may obtain the set of related object search results by searching clues obtained from the focal object. The system may also search clues obtained from the related objects to discover additional related objects. The system may analyze text extracted from the focal object, meta data of the focal object, the related objects, and/or meta data of the related objects, among other objects. The system may also analyze user action information and other object information.

The display arrangement of the related objects on the GUI 400 may be based on relevance of the search results, user-defined ordering, chronologically and/or temporally previous user actions, and/or other display arrangement criteria. In portal 400, the focal object 410 may be displayed in an upper left hand position of the GUI while related objects 420 may be displayed in the remaining locations of the GUI. One of ordinary skill in the art would realize that placement of focal object 410 in an upper left hand position of the GUI is merely exemplary. Other placement may be used, as would be apparent.

Related objects 420 may be displayed such that the most relevant objects are located closest to the focal objects and least relevant objects are located farthest away from the focal object. However, other configurations are contemplated. The information portal may be dynamically generated based on criteria established by the user or other criteria.

Figure 5:
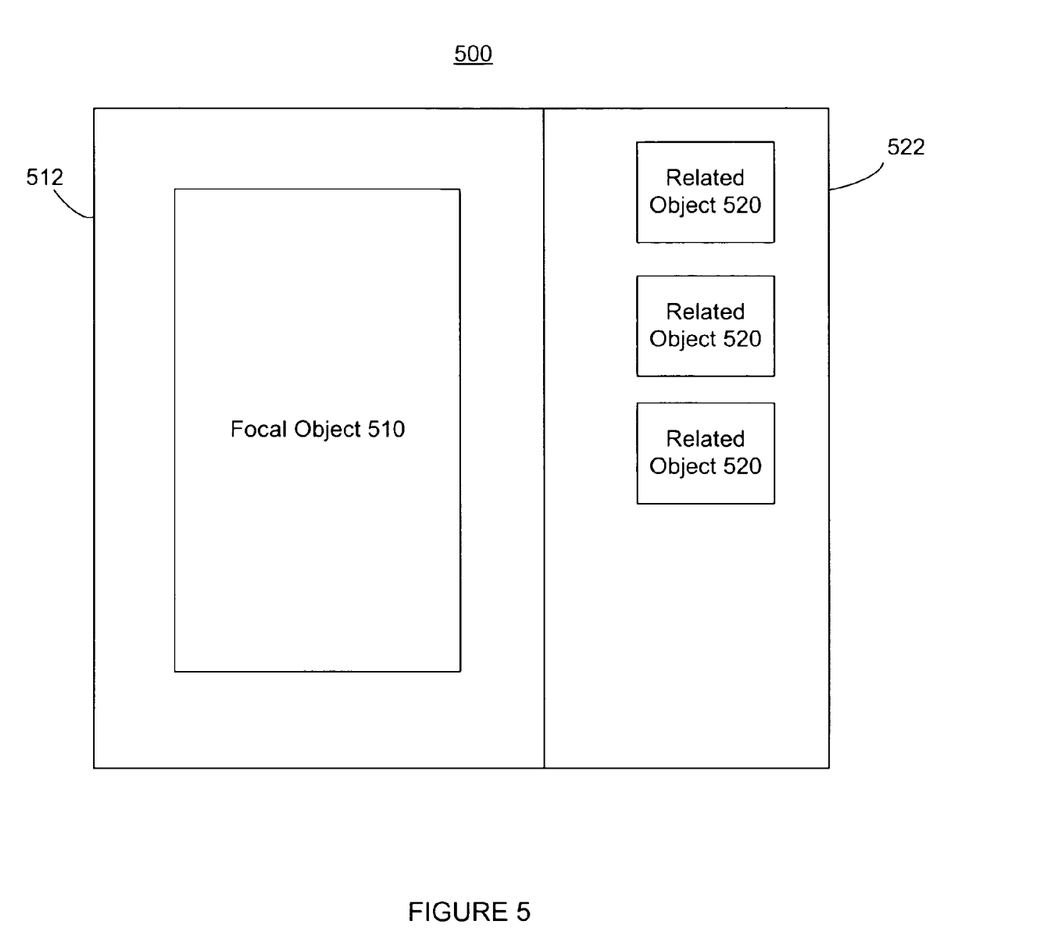
FIG. 5 illustrates an exemplary information portal according to an embodiment of the invention.

FIG. 5 depicts another example of an information portal. Information portal 500 may be integrated with an object in use. As illustrated in FIG. 5, the focal object 510 may be presented in a large frame 512 within an object while related objects 520 are displayed in a separate frame 522. Related objects 520 may be presented from top to bottom in order of decreasing relevance. Other methods of displaying related objects may be employed.

For example, information may be depicted according to its relationship with the focal object. As described in reference to FIG. 3, relationships between objects may be inferred based on analyzing several types of information associated with the objects, including user action information, content of the objects, context in which the object was accessed by the user, and other types of information. A relationship between two or more objects may be inferred through user action associated with the objects, such as the temporal order in which the objects are accessed, whether the user accessed a second object through a first object, whether a first object was opened contemporaneously with a second object, and/or other user actions.

Further, the system may perform query chaining that includes analyzing the related objects and automatically extracting clues from the related objects to generate additional related objects. The process may be repeated until clues are exhausted or some other threshold is reached. For example, a search on the focal object may return an email message object as a related object. A search on the email message object may return one or more document objects that were included as attachments in the email message object. In portal 500, the email message object may be displayed adjacent to the focal object, while the document objects may be displayed several objects removed from the focal object.

According to an embodiment of the invention, the user may select a related object that is displayed on the GUI to designate the selected object as a new focal object. For example, a user may designate a related object 520 of portal 500 or a related object 420 of portal 400 as a new focal object. In response, a new GUI may be generated that includes the selected object in the position of the focal object. In a preferred embodiment, software for providing the GUI resides on related object determining system 134. However, a module for generating the GUI may be separately located from system 134 or system 130.

Text extracted from the new focal object, user action information, and other fecal object information may be analyzed. The system may search on the new focal object information to provide a set of related objects to be displayed on the GUI along with the new focal object. The display arrangement of the related objects on the GUI may be based on relevance of search results, user-defined ordering, or other display arrangement criteria.

Figure 6:
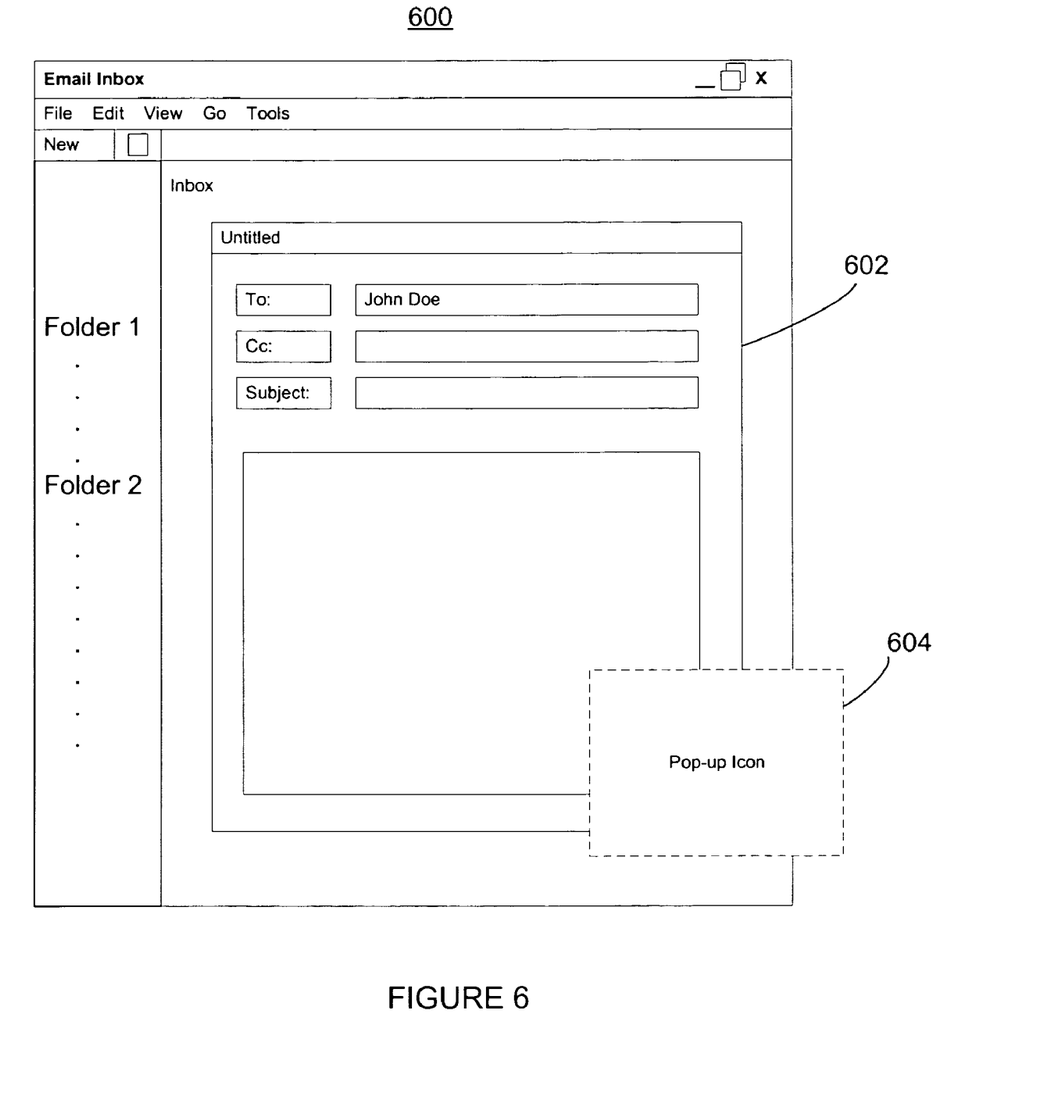
FIG. 6 illustrates a graphical user interface according to some embodiments of the invention.

FIG. 6 depicts a graphical user interface 600, according to various embodiments of the invention. A user may be working within an application object, such as the email application depicted in FIG. 6. A new email message object 602 may be generated, and this email message object may be considered a focal object. The email message object 602 may include common email message fields such as, for example, a "To" field 604, a "CC" field 606, a "Subject" field 608, and or other fields. Email message object 602 also includes a composition space 610 for composing the email message.

In accordance with various embodiments of the invention, search clues may be obtained from the focal object 602 to discover related objects. As depicted in FIG. 6, a user has entered the name "John Doe" into the "To" field of email message object 602. A search may then be performed using the gathered timeline information regarding "John Doe." Search results may be presented to the user as one or more icons. For example, the user may be presented with popup icon 620. Popup icon 620 may display information such as, for example, an address book entry associated with John Doe, one or more objects created or edited by John Doe, one or more conversations previously held between the user and John Doe, and/or any other information.

According to some embodiments of the invention, icons may be provided displaying information related to a focal object, such as the related objects. The icons may populate a graphical user interface only when information is provided for display and then disappear from the GUI after a predetermined amount of time elapses. The system may search clues obtained from a focal object associated with the information portal to discover related objects.

Additionally, clues may be obtained from related objects to discover additionally related objects. Characteristics of the icons, such as size, color, shape, location on the GUI and/or other characteristics may be used to signify the relevance of information presented in the information portal. According to some embodiments of the invention, characteristics of the icons, such as size, color, shape, location on the GUI, the length of time it is displayed, and/or other characteristics may be used to signify the relevance of the information provided. For example, information most relevant to the focal object may be displayed bright red and on top of the focal object, and may remain for a longer period of time than less relevant information. Additionally, the user may retrieve the object presented in the popup icon by selecting it while it is being displayed.

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein. The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A method of performing a search, comprising:
   receiving a selection of a focal object from a user;
   in response to receiving the selection of the focal object from the user, automatically and without subsequent user intervention:
   i) extracting focal information from the focal object;
   ii) identifying a first related object containing the focal information;
   iii) extracting first related information from the first related object;
   iv) identifying a second related object containing the first related information; and
   v) displaying the first related object and the second related object temporarily.

2. The method according to claim 1, wherein displaying the first related object begins for a predetermined period of time after the first related object is identified and displaying the second related object begins for a predetermined period of time after the second related object is identified.

3. The method according to claim 1, wherein extracting focal information includes extracting user action information relating to the focal object from a chronological timeline as focal information.

4. The method according to claim 1, wherein second related information is extracted from the second related object, and a third related object is identified from the second related information.

5. The method according to claim 1, further comprising displaying the focal object, first related object and second related object together in a graphical user interface.

6. The method according to 5, wherein the first related object becomes a new focal object when a user selects the first related object in the graphical user interface, and wherein in response to the selection, the previous focal object is identified as a related object of the new focal object and is displayed with the new focal object.

7. The method according to claim 1, wherein extracting focal information includes extracting at least one of text of the focal object and meta data of the focal object.

8. The method according to claim 1, wherein the first related object is displayed with at least one characteristic signifying a relevance of the first related object to the focal object and the second related object is displayed with at least one characteristic signifying a relevance of the second related object to the focal object.

9. The method according to claim 8, further comprising displaying a first icon associated with the first related object and displaying a second icon associated with the second related object, wherein a characteristic of the first icon signifies the relevance of the first related object to the focal object and a characteristic of the second icon signifies the relevance of the second related object to the focal object.

10. The method according to claim 9, wherein the characteristic of the first icon comprises one or more of: size of the first icon, color of the first icon, shape of the first icon, location of the first icon on a graphical user interface, or length of time the first icon is displayed; and the characteristic of the second icon comprises one or more of: size of the second icon, color of the second icon, shape of the second icon, location of the second icon on a graphical user interface, or length of time the second icon is displayed.

11. The method according to claim 1, wherein identifying the first related object includes analyzing chronological timeline information to identify the first related object containing the focal information.

12. The method according to claim 1, wherein the focal object comprises an object that a user is currently interacting with or desires to have as a focus of a search.

13. The method according to claim 1, further comprising:
inferring relationships between the focal object and the first and second related objects, wherein the relationships are inferred based on one or more of: user action information associated with the objects, content of the objects, or context in which the objects are accessed by the user.

14. The method according to claim 13, wherein inferring relationships between the focal object and the first and second related objects based on user action information associated with the objects comprises inferring relationships based on one or more of: chronological proximity of user-initiated actions; chronological proximity of window focus toggling, temporal proximity in which users access two or more objects, temporal proximity in which users create two or more objects, or temporal proximity in which users edit two or more objects.

15. The method according to claim 1, further comprising:
performing a relevancy ranking of the first related object and the second related object to the focal object to determine the strength of a relationship between the first and second related objects and the focal object; and
displaying the first and second related objects with the focal object if the strength of the relationship exceeds a predetermined threshold for the relevancy ranking.

16. The method according to claim 1, further comprising performing query chaining until a threshold is met, wherein query chaining comprises:
extracting related information from related objects; and
identifying one or more further related objects based on the extracted information until the threshold is met.

17. The method according to claim 1, wherein the search is performed in an email application, the focal object includes at least one email message, and the extracted focal information includes information related to at least one field of the email message.

18. The method according to claim 17, wherein the first related object includes an object associated with the email application that relates to the extracted field information.

19. A system for performing a search, comprising:
an interface for receiving a selection of a focal object from a user; and
an object determining system having
a focal information extractor that in response to receiving the selection of the focal object from the user, automatically and without subsequent user intervention extracts focal information from the focal object, and
a related object identifier that in response to receiving the selection of the focal object from the user, automatically and without subsequent user intervention identifies a first related object containing the focal information, extracting first related information from the first related object, and identifying a second related object containing the first related information,
wherein the object determining system in response to receiving the selection of the focal object from the user, automatically and without subsequent user intervention displays the first related object and the second related object temporarily on the interface.

20. The system according to claim 19, wherein the related object identifier analyzes chronological timeline information to identify the first related object containing the focal information.

21. The system according to claim 19, wherein the focal information extractor further extracts user action information relating to the local object from a chronological timeline as focal information.

22. The system according to claim 19, wherein the related object identifier further extracts second related information from the second related object and identifies a third related object from the second related information.

23. The system according to claim 19, further comprising a graphical user interface for displaying the focal object, first related object and second related object.

24. The system according to 23, wherein the first related object becomes a new focal object when a user selects the first related object in the graphical user interface, and wherein in response to the selection, the previous focal object is identified as a related object of the new focal object and is displayed with the new focal object.

25. The system according to claim 19, wherein the focal information extractor extracts at least one of text of the focal object and meta data of the focal object.

26. The system according to claim 19, wherein the first related object is displayed with at least one characteristic signifying a relevance of the first related object to the focal object and the second related object is displayed with at least one characteristic signifying a relevance of the second related object to the focal object.

27. The system according to claim 26, wherein a first icon associated with the first related object is displayed and a second icon associated with the second related object is displayed, wherein a characteristic of the first icon signifies the relevance of the first related object to the focal object and a characteristic of the second icon signifies the relevance of the second related object to the focal object.

28. The system according to claim 27, wherein the characteristic of the first icon comprises one or more of: size of the first icon, color of the first icon, shape of the first icon, location of the first icon on a graphical user interface, or length of time the first icon is displayed; and the characteristic of the second icon comprises one or more of: size of the second icon, color of the second icon, shape of the second icon, location of the second icon on a graphical user interface, or length of time the second icon is displayed.

29. The system according to claim 19, wherein displaying the first related object begins for a predetermined period of time after the first related object is identified and displaying the second related object begins for a predetermined period of time after the second related object is identified.

30. The system according to claim 9, wherein the focal object comprises an object that a user is currently interacting with or desires to have as a focus of a search.

31. The system according to claim 19, wherein the search is performed in an email application, the focal object includes at least one email message, and the extracted focal information includes information related to at least one field of the email message.

32. The system according to claim 31, wherein the first related object includes an object associated with the email application that relates to the extracted field information.

33. A method of performing a search, comprising:
receiving a selection of a focal object from a user;
in response to receiving the selection of the focal object from the user, automatically and without subsequent user intervention:
i) extracting focal information from the focal object;
ii) identifying a first related object containing the focal information;

iii) extracting first related information from the first related object;
iv) identifying a second related object containing the first related information;
v) displaying the first related object with at least one characteristic signifying a relevance of the first related object to the focal object; and
vi) displaying the second related object with at least one characteristic signifying a relevance of the second related object to the focal object.

34. The method according to claim 33, wherein displaying the first related object begins for a predetermined period of time after the first related object is identified and displaying the second related object begins for a predetermined period of time after the second related object is identified.

35. The method according to claim 33, wherein displaying is temporary.

* * * * *